US006296474B1

United States Patent
Butler et al.

(10) Patent No.: US 6,296,474 B1
(45) Date of Patent: Oct. 2, 2001

(54) BURNER-LOG ELEMENT

(75) Inventors: Gary Lee Butler, Silver Lake; David Charles Lyons, Red Wing; Robb Edward Bennett, Prior Lake, all of MN (US)

(73) Assignee: Hon Technology Inc., Muscatine, IA (US)

( * ) Notice: Subject to any disclaimer, the term of this patent is extended or adjusted under 35 U.S.C. 154(b) by 0 days.

(21) Appl. No.: 09/484,390

(22) Filed: Jan. 13, 2000

(51) Int. Cl.[7] ........................................... F23D 14/46
(52) U.S. Cl. ................................ 431/125; 264/87; 264/279
(58) Field of Search .......................... 126/512; 431/125; 428/18; 264/86, 87, 279

(56) References Cited

U.S. PATENT DOCUMENTS

| 1,483,570 | * | 2/1924 | Brown ..................................... 428/18 |
| 3,377,229 | * | 4/1968 | Bryan ..................................... 431/125 |
| 4,875,464 | | 10/1989 | Shimek et al. . |
| 4,890,601 | | 1/1990 | Potter . |
| 5,271,888 | * | 12/1993 | Sinsley ................................... 264/87 |
| 5,655,513 | * | 8/1997 | Whitfeld ............................... 126/512 |
| 5,800,875 | * | 9/1998 | Hussong ................................. 264/87 |
| 5,918,592 | * | 7/1999 | Kazubski et al. ..................... 126/512 |
| 6,048,195 | * | 4/2000 | Shimek et al. ........................ 431/125 |

* cited by examiner

Primary Examiner—Sara Clarke
(74) Attorney, Agent, or Firm—Merchant & Gould P.C.

(57) ABSTRACT

A log-burner apparatus is for simulating a burning log or piece of wood wherein at least a portion of the burner aperture of the burner is not defined by and does not extend through the artificial log material. As such, any adverse effect of the artificial log material on the efficiency of the burner is reduced. Additionally, the burner apparatus provides for durability of the burner while still providing a realistic simulation of flame coming from a log.

In one embodiment, a gas burner apparatus including a gas burner structure with an outer surface including a portion with at least one burner aperture therein. The apparatus further includes an artificial log having an outer surface, and the artificial log is disposed at least partially around the gas burner structure. At least a portion of the outer surface of the burner structure including the burner aperture is exposed adjacent the outer surface of the artificial log.

In another aspect, a method of making a gas burner apparatus. The method includes the step of providing a burner structure including an outer surface. The outer surface includes a burner portion having at least one burner aperture therein, and a second portion adjacent the burner portion. The method also includes the step of forming an artificial log at least partially around the burner structure such that the burner surface portion is exposed, and at least some of the second portion is in communication with the artificial log.

14 Claims, 3 Drawing Sheets

BURNER-LOG ELEMENT

FIELD OF THE INVENTION

This invention relates generally to artificial log elements. More particularly, the invention relates to artificial log elements which also serve as gas burners.

BACKGROUND OF THE INVENTION

Fireplaces have been used for centuries as a means for providing heat, for cooking and for simply decorative purposes. In recent years, fireplaces using gaseous fuels, for example natural gas, manufactured gas, and propane, have become very popular due to their efficiency, ease of operation, and cleanliness. One potential drawback of such gas fires, however, is that they tend not to be as aesthetically pleasing as natural wood fires.

Artificial solid ceramic logs for use in gas fireplaces are generally known to help provide an aesthetically pleasing appearance to such fireplaces and to simulate a wood-burning fireplace. Such artificial logs were typically placed over a conventional gas burner element to help hide the burner element from view and to simulate a natural wood fire. While such artificial logs have been somewhat effective in improving the aesthetics of gas fires, they have not been entirely effective in simulating a wood burning fire wherein flame comes directly from the burning logs.

In an attempt to remedy some of the deficiencies of known artificial logs, some artificial burning log assemblies have been produced. For example, U.S. Pat. No. 5,655,513 to Whitfield (the "'513 Patent") discloses a gas burning imitation log assembly including an imitation log carried by a gas supply conduit. The assembly includes openings or slots that extend through both the gas supply conduit and the imitation log material. Gas is fed through the supply conduit and diffuses through the slots for combustion to create flames coming from the log. However, as disclosed by the '513 Patent, the artificial log material is cooler than the flame generated by the combustion gas, and thereby acts to cool the flame and hinder complete combustion of the gas. Partial combustion is undesirable for many reasons, for example, because it results in the production of noxious carbon monoxide and the buildup of soot on the log. To achieve complete combustion in the burner log disclosed by the —513 Patent, the thickness of the log and the shape and position of the slots must be selectively chosen. Additionally, artificial log materials, such as ceramic or refractory materials, are not as durable as traditional burner material when used as a burner surface.

Thus, there is still a need for additional innovations in burner-log elements to help improve burn efficiency and burner durability while still providing a realistic simulation of flame coming from a log.

SUMMARY OF THE INVENTION

A log-burner apparatus is provided for simulating a burning log or piece of wood wherein at least a portion of the burner aperture of the burner is not defined by and does not extend through the artificial log material. As such, any adverse effect of the artificial log material on the efficiency of the burner is reduced. Additionally, the burner apparatus provides for durability of the burner while still providing a realistic simulation of flame coming from a log.

In one aspect, the invention is directed to a gas burner apparatus including a gas burner structure with an outer surface including a portion with at least one burner aperture therein. The apparatus further includes an artificial log having an outer surface, and the artificial log is disposed at least partially around the gas burner structure. At least a portion of the outer surface of the burner structure including the burner aperture is exposed adjacent the outer surface of the artificial log.

In at least some embodiments, the first portion is a burner portion, and the burner structure includes a second portion adjacent the burner portion. Further, the artificial log has an inner surface and the inner surface of the log is disposed at least partially around the outer surface of the gas burner structure, wherein the second portion of the outer surface of the gas burner abuts the inner surface of the log.

Another aspect of the invention is directed to a method of making a gas burner apparatus. The method includes the step of providing a burner structure including an outer surface. The outer surface includes a burner portion having at least one burner perture therein, and a second portion adjacent the burner portion. The method also includes the step of forming an artificial log at least partially around the burner structure such that the burner surface portion is exposed, and at least some of the second portion is in communication with the artificial log.

BRIEF DESCRIPTION OF THE DRAWINGS

Referring to the figures, wherein like numerals represent like parts throughout the several views.

Figure 1:
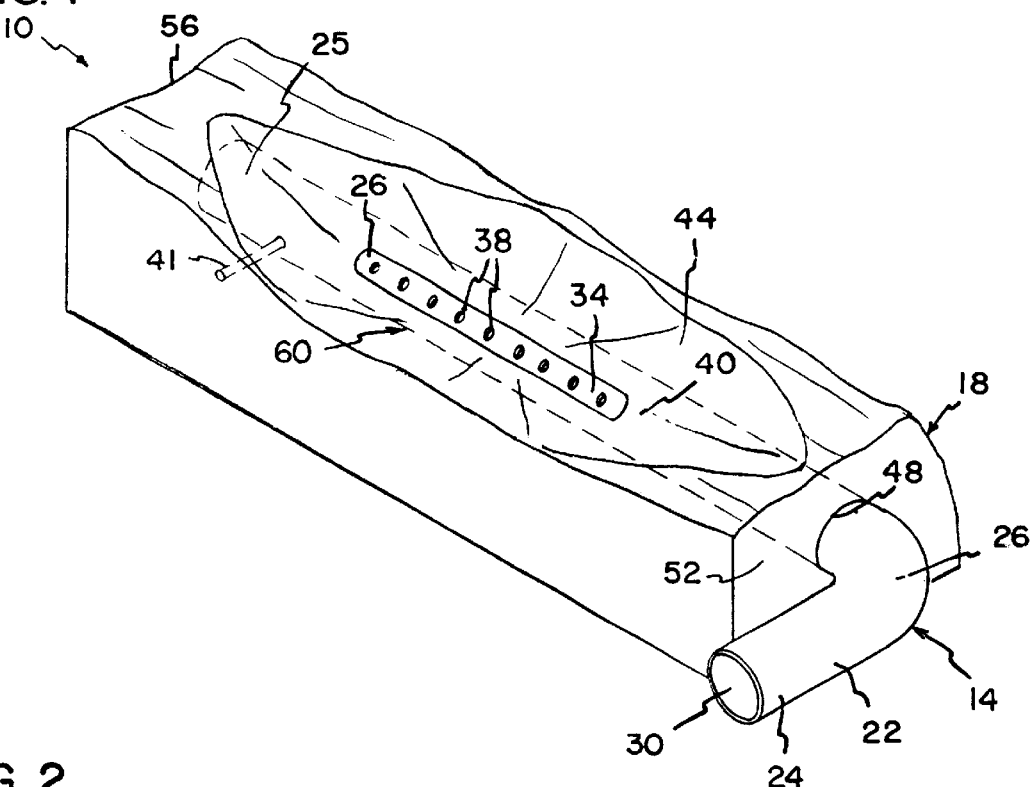
FIG. 1 is a perspective view of a burner apparatus embodying the invention.

The organization and maimer of the structure and operation of the invention, and advantages thereof, may best be understood by reference to the following description of preferred embodiments, taken in combination with the above referenced accompanying drawings, wherein like reference numerals identify like elements throughout the descriptions and views.

DETAILED DESCRIPTION OF THE PREFERRED EMBODIMENT

FIG. 1 illustrates one embodiment of the invention including a gas burner apparatus 10. Gas burner apparatus 10 includes a gas burner structure 14, and an artificial log 18 disposed at least partially around the burner structure 14. A burner portion 34 of the burner structure 14 is exposed adjacent the outer surface 44 of the artificial log 18 such that at least a portion of burner apertures 38 in the burner portion 34 are spaced from the artificial log material to reduce the effect of the log material on the burn efficiency, while still providing a realistic simulation of a burning log.

In this particular embodiment, the gas burner structure 14 includes a generally hollow conduit member 22 having a first end 24, a second end 25, an outer surface 26, and a hollow inner conduit 30. The burner structure 14 is preferably in the shape of a hollow tube, having a generally circular cross-section. However, as will be understood by those of skill in the art and others, a broad variety of burner structure configurations may be used, and the invention is not limited to any particular burner structure, configuration, or shape. Any burner structure, configuration, or shape that can be disposed within an artificial log as discussed herein is suitable for use with the invention.

The outer surface 26 of the burner structure 14 includes a first burner portion 34 having at least one burner aperture or jet 38, therein. The burner portion 34 is exposed to the external environment of the log 18, and is not covered by the material of the artificial log 18, as will be discussed more fully below. The burner aperture or apertures 38 extend through the burner portion 34 and thereby connect the outer surface 26 to the hollow interior of conduit 30. As such, at least a portion of the burner apertures 38 are not defined by or in contact with the artificial log 18.

In this particular embodiment, a plurality of burner apertures 38 are shown, but it should be understood that the number of burner apertures 38 within the burner portion 34, as well as the size of the burner portion 34, and the size of the burner apertures 38 may vary from one embodiment to the next, limited only by the available space and desired appearance and function of the finished burner apparatus 10.

The outer surface 26 also includes a second non-burner portion 40 adjacent and abutting the first burner portion 34. The second portion 40 does not include any burner apertures therein, and can generally be defined as the portion of surface 26 that abuts and is about the burner portion 34. Preferably, the second portion 40 includes most or all of the surface 26 that is disposed within the artificial log 18, and is not exposed to the external environment, as will be discussed more fully below.

The burner structure 14 is generally made of a non-combustible material. The burner structure 14, and especially the burner portion 34 of the burner structure 14, is preferably made of a material that is known to be useful as an efficient burner surface for a gas burner. For example, the burner structure 14 can be made from non-combustible metals, and other such material. Preferably, the combustion structure is made of a non-combustible metal such as steel, aluminum, iron or other such metals. Most preferably, the burner structure 14 is stainless steel or an aluminized metal.

In some embodiments, the burner structure 14 can include a retaining member 41. The retaining member 41 is an elongated flange extending from the surface 26 of the burner structure 14 that acts to retain the burner structure 14 within the artificial log 18 when the log 18 is formed around the burner structure 14.

The hollow conduit member 22 is adapted to be a gas supply conduit from a gas supply source (not shown) to the burner apertures 38. A gas supply source (not shown) can be provided for communication with the first end 24 to supply a fuel gas or a fuel gas/air mixture to the burner structure 14. Any gas supply source or structure, such as a gas supply line, or a gas supply line including a venturi or mixing valve, that is generally known in the art, may be used and connected to the first end 24.

The artificial log 18 is disposed at least partially around the gas burner structure 14, and includes an outer surface 44, an inner surface 48, a first end 52 and a second end 56. The end 24 of the burner structure 14 extends through the outer surface 44 of the log 18 for connection to a gas supply source (not shown). In the embodiment shown, the end 24 of the burner structure 14 extends through the outer surface 44 at the first end 52, but it should be understood that in other embodiments, the end 24 of the burner structure 14 may extend through the surface 44 of the log 18 at other locations, depending only upon the desired structure and use of the burner apparatus 10.

Preferably, the inner surface of the log 18 is at least partially disposed around and is in communication with or abuts at least a part of the outer surface 26 of the burner structure 14. More preferably, the log 18 is molded or formed to burner structure 14 such that at least part of the second portion 40 of the outer surface 26 is in intimate contact with or abuts at least a part of the inner surface 48 of the log 18.

The log 18 is disposed around the burner structure 14 such that the burner portion 34 is not covered by the log, thereby leaving the burner portion 34 exposed to the external environment. Preferably, the burner portion 34 includes enough surface such that the artificial log 18 is substantially spaced from the burner apertures 38. Therefore, the burner apertures 38 on the burner portion 34 include at least a portion thereof that is not surrounded by, defined by, or in contact with, the material of the artificial log 18. As such, the artificial log material is generally spaced from the functional burner surface 34, and the cooling effect of the artificial log material on the flame generated by the combustion gas at the burner surface 34 is reduced. Therefore, there is a more efficient burn and more complete combustion of the gas as compared to prior art log burners where the artificial log material defined the burner apertures, and thereby cooled the flame.

The artificial log 18 can be made of any generally non-combustible materials known in the art for making artificial logs. Preferably, the artificial log is made of ceramic or refractory materials generally known in the art, and is made using molding, forming, or casting techniques to mold, form, or cast the artificial log 18 onto the burner structure 14 such that the burner portion 34 is exposed. More preferably, the artificial log is made from a moldable slurry of ceramic fibers, preferably vitreous aluminum silicate fibers, and a binder, preferably amorphous silica, to form strong fiber reinforced ceramic logs. The preferred methods for making the artificial log are discussed in more detail below in reference to FIGS. 4–6.

The outer surface 44 of the log 18 is preferably shaped, textured and colored to imitate a burning log or piece of wood. It should be understood that different embodiments can have different log shapes, colors, and sizes, just as natural logs have different shapes, colors and sizes. The outer surface 44 also preferably defines at least one burning zone 60 where the burner portion 34 is exposed, as discussed above. The burning zone 60 generally defines a slot or gap in the outer surface 44 of the log, and therefore, in one respect, the burner portion 34 can be described as being exposed adjacent to or contiguous with the outer surface 44 of the artificial log 18.

The exposed burner portion 34 can be colored to match the color of the log to provide a more realistic look. For example the burning zone 60 and the burner portion 34 can be colored black to simulate burnt or burning wood.

The burner apparatus 10 can be used wherever it is appropriate and desirable to simulate a burning log or piece of wood using a gas flame. The apparatus 10 is particularly well suited for burning in the combustion chamber of a gas fireplace, stove, grill, or other such applications.

Figure 2:
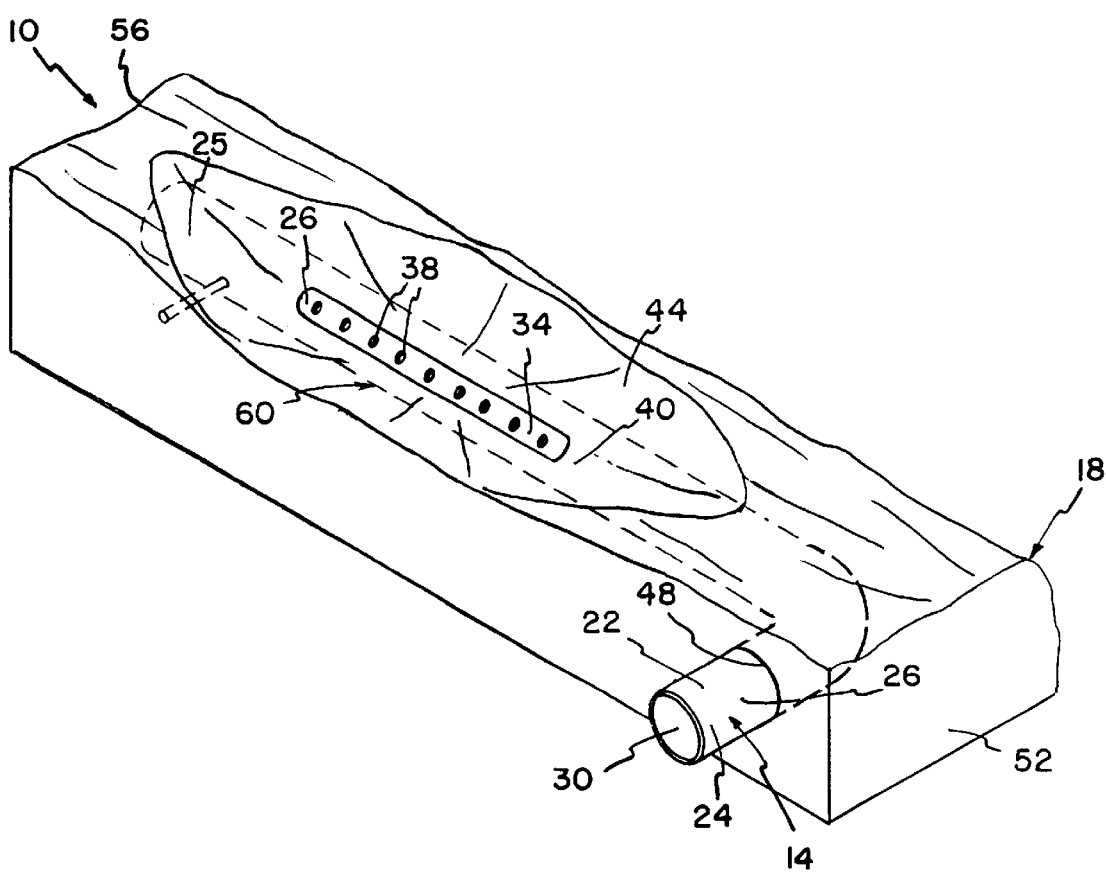
FIG. 2 is a perspective view of another burner apparatus embodying the invention.

FIG. 2 illustrates a second embodiment of a burner apparatus 10 that is very similar to the one shown in FIG. 1, wherein like reference numerals identify like elements. However, in the embodiment shown in FIG. 2, the end 24 of the burner structure 14 extends through the outer surface 44 of the log 18 for connection to a gas supply source at a side of the log 18. As discussed above, it should be understood that in other embodiments, the end of the burner structure may extend through the surface of the log at other locations, depending only upon the desired structure and use of the burner apparatus 10.

Although the above remarks described embodiments of the invention in relation to a single burner apparatus 10, it is to be understood that the burner apparatus can be used in conjunction with other artificial logs or burner assemblies. Additionally, a plurality of burner apparatuses embodying the invention can be used together in a burner system.

Figure 3:
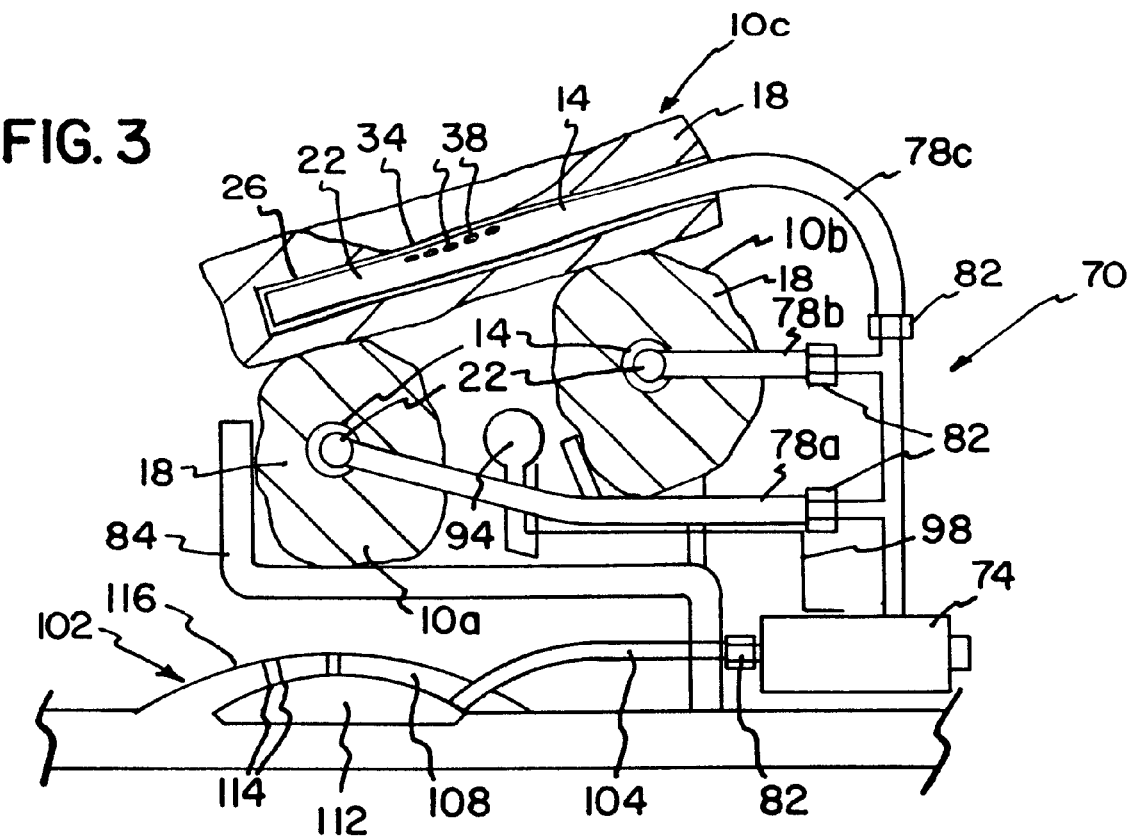
FIG. 3 is a cross-sectional side view of an artificial log system including burner apparatuses embodying the invention.

For example, referring to FIG. 3, a partial cross sectional end view of one embodiment of a burner system, or log set 70, using a plurality of burner apparatuses is illustrated. Specifically, a front burner apparatus 10a, a rear burner apparatus 10b, and a transverse burner apparatus 10c are shown. The burner apparatuses 10a, 10b, and 10c are supported on a non-combustible grate 84, for example a ceramic or metal grate.

Each of the burner apparatuses 10a, 10b, and 10c includes the same general structures as the burner apparatus 10 as described above in reference to FIG. 1, with the only potential difference being the shape, size, texture, color or configuration of the outer surface of the artificial log 18. Such features can be changed depending upon the desired look and feel of the system. Therefore, each of the burner apparatuses 10a, 10b, and 10c includes a gas burner structure 14 including a generally hollow conduit member 22, and an artificial log 18 disposed at least partially around the burner structure 14. Furthermore, each burner structure 14 includes a surface 26 having a burner portion 34 (not shown in 10a and 10b) that is exposed adjacent the outer surface of the artificial log 18, and the burner portions 34 include burner apertures 38 for burning gaseous fuel.

The system 70 further includes a control box 74 which is connected to a source of gaseous fuel (not shown). Gas inlet pipes 78a, 78b and 78c extend from the control box, and are in communication with the generally hollow conduit members 22 of the burner apparatuses 10a, 10b and 10c. A fuel/air mixing system 82, such as a mixing valve, or a venturi cap, can be disposed in the pipes interconnecting the control box and the conduit members 22 for adjusting the air to fuel ratio. The structure of such mixing valve or venturi cap systems can be of any generally known in the art. Fuel is supplied through the control box 74, through the gas inlet pipes 78a, 78b and 78c, into the hollow conduit members 22, and through burner apertures 38 wherein combustion takes place about the burner portions 34.

The system can include a pilot 94 to assist in lighting. It will be understood that the pilot will connect to the control box 74 via a gas line 98. It is optional to supply a lighter tube (not shown) between the burner portions 34 and the pilot 94. The pilot arrangement 94, however, may be replaced with an electronic spark ignition system (not shown) using a ground plate or spark plate on the rear of the burner apparatuses adjacent the burner portions 34 where the spark module would not be seen from the front.

The system can also include an ember simulating element 102 disposed below the grate for simulating glowing embers from a wood fire. Any such ember simulating elements that are generally known may be used. Typically, such elements 102 require a gas supply, and are thus connected to the control box 74 via a gas line 104. The element includes a structural member 108 that defines a hollow area 112 and small burner jets 114 that are generally termed glowing ember jets and do not emit long flames. The surface 116 of the structural member 108 can be adapted or shaped to look like embers or ashes from a wood fire. Optionally, emberizing material, such as rock wool, mineral wool, vermiculite, or other such ember or ash simulating material may be placed about the emberizing jets to further simulate ember or ash material.

Figure 4:
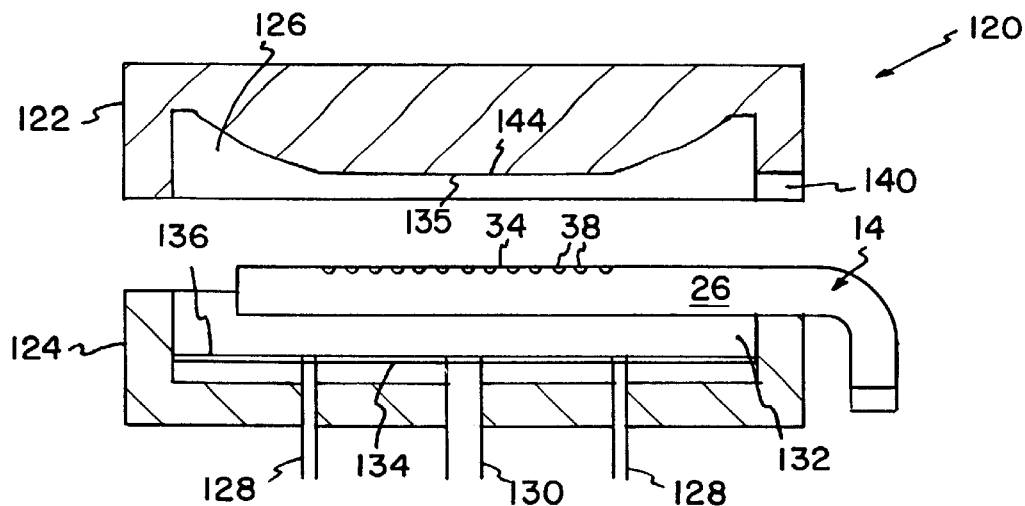
FIG. 4 is a cross-sectional view of a mold used to create a burner apparatus embodying the invention showing the mold in an open position and having a burner structure positioned therein.
Figure 5:
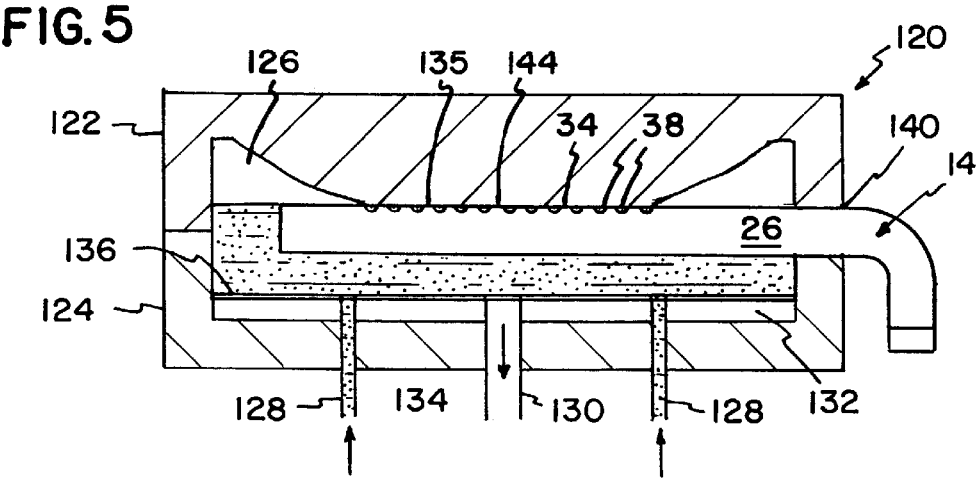
FIG. 5 is a cross-sectional view of the mold of FIG. 4 in a closed position and having a burner structure positioned therein and being partially filled with mold material.
Figure 6:
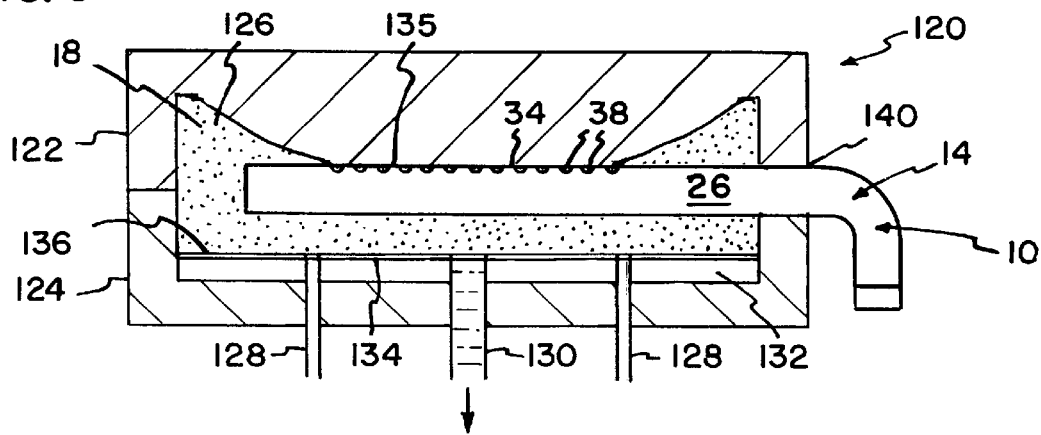
FIG. 6 is a cross-sectional view of the mold of FIG. 4 in a closed position and having a burner structure positioned therein and showing the mold filled with mold material.

With reference now generally to FIGS. 4–6, an example of one preferred method for making one embodiment of a gas burner apparatus 10 of the invention will be described. As discussed briefly above, the artificial log 18 is preferably made of ceramic or refractory materials generally known in the art, and is made using molding, forming, or casting techniques to mold, form, or cast the artificial log 18 onto the burner structure 14.

More preferably, the artificial log 18 is made from a moldable slurry of ceramic fibers, preferably vitreous aluminum silicate fibers, and a binder, preferably amorphous silica. The moldable slurry is molded onto the burner structure 14 such that the burner portion 34 is exposed to make the burner apparatus 10. It is pointed out that U.S. Pat. No. 5,941,237 (the "'237 Patent"), which is hereby incorporated herein by reference for all purposes, discloses a method of making fiber reinforced combustion chamber structures of the same general material. Therefore, the molding process used in the '237 Patent to make combustion chamber structures is generally the same process used to mold the artificial log 18.

Initially, the moldable slurry of ceramic fibers must be made. The fibers of alumina silicate are mixed with a binder solution which is in aqueous form. The high temperature reinforced fibers preferably are made from a mixture of silica and alumina ($SiO_2$ and $Al_2O_3$) which are mixed and then melted and formed as fibers. The fibers are formed by blowing drops or portions of the melted mixture to form fibers that are graded by length and preferably are in a form of ½ to 1½ inches in length when mixed with amorphous silica. The preferred aqueous solution is a binder of amorphous silicate which may be purchased from Nalco Chemical Inc., in Naperville, Ill. under the designation Nalco 1140.

After the combination of fibers and binder solution are mixed together, they are agitated so that the fibers completely adsorb the binder solution. After the mixing and agitation occurs, a slurry or paste is formed that is of a consistency which permits the mixture to be used to fill molds or casts, and is ready to be molded or cast onto the burner structure 14. Although many casting or molding techniques may be used, preferably the burner apparatus 10 of the invention is formed using vacuum molding.

Referring to FIG. 4, a cross section of a vacuum mold 120 in an open position is shown, including a top 122 and a bottom 124 which together define a mold opening 126 in the desired shape of the artificial log 18. The mold opening 126 includes an upper surface 135 and a lower surface 136. The mold bottom 124 includes mold injection ports 128, and a vacuum evacuation port 130. The evacuation port 130 is interconnected with evacuation area 132 within the mold bottom 124, which is below screen member 134. The screen member 134 defines the lower surface 136 of the mold opening 126.

The top 122 and bottom 124 mold portions define an aperture 140 in the walls thereof in which a burner structure 14 can extend through to be properly positioned in the mold.

The mold opening 126 is of such a shape, and the aperture 140 is of such an angle that when the burner structure 14 is properly placed in the aperture 140 and extends into the mold opening 126, a portion 144 of the upper surface 135 of the mold comes into contact with a portion of the outer surface 26 of the burner structure (FIG. 5). Specifically, the portion 144 of the upper surface 135 of the mold comes into contact with the burner portion 34 including at least one burner aperture 38 therein.

As seen in FIG. 5, once the burner structure 14 is properly positioned within the mold opening 126, and the mold is closed, the slurry or paste of mold material prepared above is forced into the mold through injection ports 128. As the mold fills with the mold slurry, water from the slurry is able to pass through the screen member 134, into the evacuation area 132 and out the evacuation port 130. Fiber from the slurry, however, cannot pass through the screen member 134, and is maintained in the mold opening 126. A vacuum is created at the vacuum port 130 to help evacuate water from the mold and dry the fiber when the mold is full. The fiber is maintained within the mold, and forms the artificial log 18 around the burner structure 14 (FIG. 6). Because a portion 144 of the upper surface 135 is in contact with the burner portion 34, the fiber cannot form artificial log 18 around the burner portion 34, thereby leaving the burner portion 34 exposed in the finished burner apparatus 10.

After the molding process is complete, the burner apparatus 10, including the artificial log 18 molded at least partially to the burner structure 14, is removed from the mold, and is dried by firing. In some embodiments, however, the artificial log material can be dried by being held in the mold, and heated. In the preferred embodiments the artificial log is dried by firing at a temperature between 3500° F. and 180° F. to drive off any of the remaining excess water from the mold solution.

After the firing the burner apparatus 10, the artificial log 18 can be trimmed or machined to a final desirable shape, if needed, and colored as desired.

We claim:

1. A gas burner apparatus comprising:
    a gas burner structure with an outer surface, the outer surface including a first portion with at least one burner aperture therein and a second portion adjacent the first portion; and
    an artificial log having an outer surface and an inner surface, the inner surface of the log being disposed around and abutting the second portion of the outer surface of the gas burner structure such that the log completely surrounds at least a cross section of the second portion of the burner structure, wherein the first portion of the outer surface of the burner structure including the burner aperture is exposed adjacent to the outer surface of the artificial log.

2. The gas burner apparatus of claim 1, wherein the portion of the outer surface is exposed such that the burner aperture is spaced from the artificial log.

3. The gas burner apparatus of claim 2, wherein the burner aperture is spaced from the artificial log so as to promote combustion of combustible gas away from the artificial log.

4. The gas burner apparatus of claim 1, wherein the artificial log is formed at least partially around the outer surface of the burner structure such that at least a portion of the artificial log is in communication with at least a portion of the outer surface of the burner structure.

5. The gas burner apparatus of claim 4, wherein the artificial log is vacuum molded onto the gas burner structure.

6. The gas burner apparatus of claim 1, wherein the artificial log is molded onto the gas burner structure.

7. The gas burner apparatus of claim 1, wherein the burner structure comprises a hollow burner conduit having a hollow interior, and the gas burner apertures connect the outer surface of the conduit to the hollow interior.

8. The gas burner apparatus of claim 7, wherein the hollow burner conduit in cross-section is generally circular in shape.

9. A gas burner apparatus comprising:
    a gas burner structure including a hollow burner conduit adapted to receive a gas fuel source, wherein said conduit has an outer surface, wherein the outer surface includes a burner portion with at least one burner aperture therein; and
    an artificial log, wherein the artificial log completely surrounds and abuts a cross section of said conduit such that the artificial log is carried by and in communication with the outer surface of the burner structure, and wherein the burner portion is exposed such that the burner aperture therein is spaced from the artificial log.

10. A gas burner apparatus comprising:
    a gas burner structure including an outer surface, the outer surface having a first portion with at least one burner aperture therein and a second portion adjacent to and surrounding the first portion; and
    an artificial log having an inner surface and an outer surface, the inner surface of the log completely surrounds and abuts a cross section of the outer surface of the gas burner structure, wherein the first portion of the outer surface of the gas burner structure is exposed adjacent the outer surface of the log, and the second portion of the outer surface of the gas burner abuts the inner surface of the log.

11. A burner system comprising:
    two or more gas burner apparatuses, each including:
    a gas burner structure with an outer surface, the outer surface including a first portion with at least one burner aperture therein and a second portion adjacent the first portion; and
    an artificial log having an outer surface and an inner surface, the inner surface of the log being disposed around and abutting the second portion of the outer surface of the gas burner structure such that the log completely surrounds at least a cross section of the second portion of the burner structure, wherein the first portion of the outer surface of the burner structure including the burner aperture is exposed adjacent to the outer surface of the artificial log; and
    a gas fuel source in fluid communication with the burner apparatuses.

12. A method of making a gas burner apparatus, the method comprising:
    providing a burner structure including an outer surface, the outer surface including a burner portion including at least one burner aperture therein, and a second portion adjacent the burner portion; and
    forming an artificial log completely around at least a cross section of the second portion of the burner structure such that the burner surface portion is exposed, wherein the second portion abuts and is in communication with the artificial log such that the burner structure carries the artificial log.

13. The method of claim 12, wherein the forming step includes molding the artificial log at least partially around the burner structure.

14. The method of claim 13, wherein the molding is performed using vacuum molding.

* * * * *

UNITED STATES PATENT AND TRADEMARK OFFICE
CERTIFICATE OF CORRECTION

PATENT NO. : 6,296,474 B1  
DATED : October 2, 2001  
INVENTOR(S) : Butler et al.

Page 1 of 1

It is certified that error appears in the above-identified patent and that said Letters Patent is hereby corrected as shown below:

Column 2,
Line 18, "perture" should read -- aperature --
Line 46, "maimer" should read -- manner --

Column 7,
Lines 31-32, "3500°F. and 180°F." should read -- 350°F and 1800°F --

Signed and Sealed this

Ninth Day of April, 2002

Attest:

JAMES E. ROGAN
*Director of the United States Patent and Trademark Office*

*Attesting Officer*